United States Patent
Kischka et al.

(10) Patent No.: US 9,306,478 B2
(45) Date of Patent: Apr. 5, 2016

(54) METHOD FOR BRAKING AN ELECTRIC DRIVE MOTOR

(71) Applicant: Andreas Stihl AG & Co. KG, Waiblingen (DE)

(72) Inventors: Claudius Kischka, Backnang (DE); Simon Trinkle, Kaisersbach (DE); Andreas Neubauer, Weissach im Tal (DE); Gernot Liebhard, Waiblingen (DE); Rene Wichert, Durlangen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 14/493,896

(22) Filed: Sep. 23, 2014

(65) Prior Publication Data

US 2015/0091480 A1    Apr. 2, 2015

(30) Foreign Application Priority Data

Sep. 28, 2013   (DE) .......................... 10 2013 016 216

(51) Int. Cl.
*H02P 3/00* (2006.01)
*H02P 3/22* (2006.01)
*H02P 3/18* (2006.01)

(52) U.S. Cl.
CPC ... *H02P 3/22* (2013.01); *H02P 3/18* (2013.01)

(58) Field of Classification Search
CPC .............. H02P 3/16; H02P 3/00; H02P 3/22; H02P 3/26
USPC ............. 318/612, 614, 56, 57, 60, 63, 86, 87, 318/400.09, 703, 741, 757, 759, 761, 258, 318/259, 362, 363, 370, 371, 372, 374, 375, 318/376; 188/24.14

See application file for complete search history.

(56) References Cited

U.S. PATENT DOCUMENTS

| | | | |
|---|---|---|---|
| 4,680,862 A | 7/1987 | Wieland et al. | |
| 5,384,522 A * | 1/1995 | Toriyama | B60L 3/0023 318/371 |
| 8,100,234 B2 | 1/2012 | Stehle et al. | |
| 8,493,011 B2 | 7/2013 | Wichert | |
| 8,587,231 B2 * | 11/2013 | Pant | B25B 23/147 173/170 |
| 2004/0183490 A1 | 9/2004 | Maeda | |
| 2014/0300300 A1 * | 10/2014 | Winker | H02P 6/142 318/400.09 |

FOREIGN PATENT DOCUMENTS

| | | |
|---|---|---|
| GB | 1 601 463 | 10/1981 |
| JP | 7-184393 A | 7/1995 |

* cited by examiner

*Primary Examiner* — Antony M Paul
(74) *Attorney, Agent, or Firm* — Walter Ottesen P.A.

(57) ABSTRACT

The invention is directed to a method for braking an electric drive motor having a stator and a rotor. The stator has field coils which have electrical phase connections for three motor phases. To generate an electromagnetic rotating field driving the rotor, the phase connections are connected to a supply voltage via switches actuated by a control unit which closes the switches depending on the rotary position of the rotor. To brake a rotating rotor, a braking current is generated by short-circuiting the phase connections. A phase short circuit is switched in between each two phase connections of the field coils with a preset temporal sequence to brake the rotor. The phase connections short-circuited are each selected corresponding to the rotary position of the rotor so that that field coil is short circuited in which the voltage induced by the magnetic field of the rotating rotor passes through its maximum.

18 Claims, 7 Drawing Sheets

METHOD FOR BRAKING AN ELECTRIC DRIVE MOTOR

CROSS REFERENCE TO RELATED APPLICATION

This application claims priority of German patent application no. 10 2013 016 216.5, filed Sep. 28, 2013, the entire content of which is incorporated herein by reference.

BACKGROUND OF THE INVENTION

Electric drive motors, in particular DC motors or brushless DC motors (EC motors), are known as electric drives for a tool of a handheld work apparatus. Such portable work apparatuses can be drills, rechargeable screwdrivers, motor-operated chainsaws, angle grinders, blowers, brushcutters, hedge trimmers or similar work apparatuses.

In order to operate a brushless electronically commutated three-phase DC motor (BEC motor or merely EC motor), an electronic control unit for an actuation circuit is necessary, by means of which the phase connections of the stator are energized in order to generate a rotating field driving the rotor of the DC motor. Such an actuation circuit is described in U.S. Pat. No. 8,493,011 and preferably comprises electronic power switches such as MOSFETs or the like. Switchover of the energization of the stator from first phase connections to next phase connections is performed depending on the position of the rotor, which needs to be established by suitable measures. Often, magnetic field sensors, so-called Hall sensors, are used for identifying the rotor position, which sensors respond to the magnetic field of the rotating rotor and output an output signal. If, for example, three Hall sensors are arranged over the circumference of the stator, the control unit can identify the rotary position of the rotor with sufficient precision by evaluation of the output signals of the Hall sensors and effect energization, matched to the rotary position, of the associated field coil.

Handheld, portable work apparatuses such as, for example, motor-operated chainsaws require a safety brake device, as is described, for example, in U.S. Pat. No. 8,100,234, for quickly bringing the tool, for example the saw chain, to a standstill. Such safety brake devices are arranged on the output side of the drive and are intended to ensure that the tool is brought to a standstill quickly. If the safety brake device is triggered, the tool is braked to a standstill in the range of approximately 120 msec.

If electric drive motors are used in handheld, portable work apparatuses, for example in motor-operated saws, electrical brake systems as documented in U.S. Pat. No. 4,680,862 are also used. The driving electric motor can be braked by short-circuiting its field coils, but the braking times which can be achieved in the process are unsatisfactory and cannot replace a safety brake device. Therefore, the safety brake devices in the form of band brakes are still necessary for achieving braking of the tool within the time range of approximately 120 msec.

If handheld, portable work apparatuses are in the form of rechargeable devices the work apparatus has a high total weight owing to the necessary rechargeable battery pack; the additional brake devices required for bringing the tool to a standstill quickly increase this weight further since the safety brake devices are complex in design terms and heavy.

SUMMARY OF THE INVENTION

It is an object of the invention to provide a method for braking an electronically commutated electric motor, with which very short braking times can be achieved with little technical complexity involved.

The electronic switches via which the phase connections of the three motor phases for driving the rotor are connected to the voltage source are used for braking the rotor of an electronically commutated drive motor. In accordance with the invention, the electric drive motor is isolated from the driving voltage and a phase short circuit is connected in each case between two phase connections of the field coils via the electronic switches in a preset time sequence for braking the rotor, while a further phase connection remains open. The phase connections which are short-circuited via the switches are each selected corresponding to the rotary position of the rotor, to be precise in such a way that the field coil in which the voltage induced by the rotating rotor passes through its maximum is always short-circuited.

In accordance with the invention, provision is therefore made for the phase connections of the motor phases not to be permanently short-circuited but for a phase short circuit to be connected only via in each case two phase connections for a limited electrical angle of rotation of the rotor, depending on the rotary position of the rotor, which is referred to as controlled short circuit. It has surprisingly been found that, by virtue of this measure of the controlled short circuit, the braking time of a polyphase electric drive motor can be significantly reduced in particular from high rotation speeds. In the case of a three-phase drive motor, braking times which are significantly shorter than in comparison with braking times with a so-called hard short circuit, in which all three phase connections are permanently short-circuited during the entire braking could be achieved from high rotation speeds of approximately 10 000 revolutions per minute. From rotation speeds of 10 000 revolutions per minute, braking times to a standstill of the rotor which are up to 50% lower than in the case of a hard short circuit were measured in the case of a three-phase drive motor.

Moreover, in the case of the controlled short circuit of a polyphase motor according to the invention, the current loading of the coils and the electronic components is on average lower than in the case of a hard short circuit. The controlled short circuit according to the invention therefore results in significantly shorter braking times with lower current loading of the drive motor and the controlling electronic components.

By virtue of the commutation from field coil to field coil according to the invention whenever a field coil is in the range of the maximum of the induced voltage, a braking current flowing in the field coils which predominantly generates exclusively decelerating torques and brakes the rotor quickly is generated over an electrical revolution. Advantageously, always that field coil whose induced voltage has passed through a zero crossing after an electrical angle of approximately 40° to 70° is short-circuited. A good compromise between short braking times and tolerable current loading of the components is achieved if in each case that field coil of the polyphase motor whose induced voltage has passed through a zero crossing after an electrical angle of approximately 60° is short-circuited.

The switchover from a first phase short circuit at the first field coil to a next phase short circuit of a field coil following in the opposite direction to the direction of rotation of the rotor preferably takes place after in each case an electrical angle of 60°. This means that a field coil is short-circuited over an electrical angle of rotation of 30° prior to a maximum of the induced voltage up to an electrical angle of rotation of 30° after a maximum of the induced voltage.

In a preferred embodiment of the invention, three field coils which are electrically connected to one another and are to be connected to a supply voltage via switches are provided for generating a rotating field in a three-phase motor.

In the case of a three-phase drive motor, braking is implemented by virtue of the fact that, in a first step, the phase connections of a first field coil are short-circuited via associated switches, with the result that a braking current flows via the first field coil and the second and third field coils, as a series circuit, are in parallel with the first field coil. In a second step, the phase connections of a second field coil which follows in opposition to the mechanical direction of rotation of the rotor are short-circuited via associated switches, with the result that a braking current flows via the second field coil and the third and first field coils, as a series circuit, are in parallel with the second field coil. In a third step, the phase connections of a third field coil following in the opposite direction to the direction of rotation of the rotor are short-circuited via associated switches, with the result that a braking current flows via the third field coil and the first and second field coils, as a series circuit, are in parallel with the third field coil. These three steps are repeated sequentially, to be precise until a preset lower limit rotation speed of the rotor is reached.

Over an electrical revolution of the rotor, it is provided for each field coil of a polyphase, in particular three-phase, motor to be short-circuited twice.

Each phase connection of a field coil is connected firstly via switches to the high side of a supply voltage and secondly via switches to the low side of the supply voltage. Over an electrical revolution of the rotor, the phase connections of each field coil are short-circuited firstly via the switches of the low side and secondly via the switches of the high side.

A three-phase electric motor with a high power is achieved by virtue of the fact that the field coils of the stator are connected to one another in an electrical delta circuit. Thus, a phase connection of the three-phase electric motor is formed between in each case two field coils. If a phase short circuit is connected via two phase connections of a first field coil, the further field coils, in a series circuit, are in parallel with the first field coil. As a result, a braking current flows not only in the short-circuited field coil, but also in the series circuit comprising the further field coils, wherein this current component is smaller than the braking current in the short-circuited field coil, however.

By virtue of the braking method according to the invention, quick braking of the rotor to a standstill thereof can be achieved.

In a simple configuration of the invention, the rotary position of the rotor is established via sensors, expediently via Hall sensors. In a development of the invention, the rotary position of the rotor can also be established without the use of sensors, in particular via the magnitude and/or the profile of the electrical voltage induced in the field coils, however. Alternatively, the rotary position of the rotor can also be determined by evaluation of the induced currents occurring as a result of induction.

In a development of the invention, the method according to the invention is used as a safety brake device for bringing the tool driven by an electric drive motor in a work apparatus, in particular in a portable, handheld work apparatus, to a standstill. It is then possible to dispense with a mechanical safety brake device. This portable, handheld work apparatus is in particular a motor-operated chainsaw, an angle grinder or a hedge trimmer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
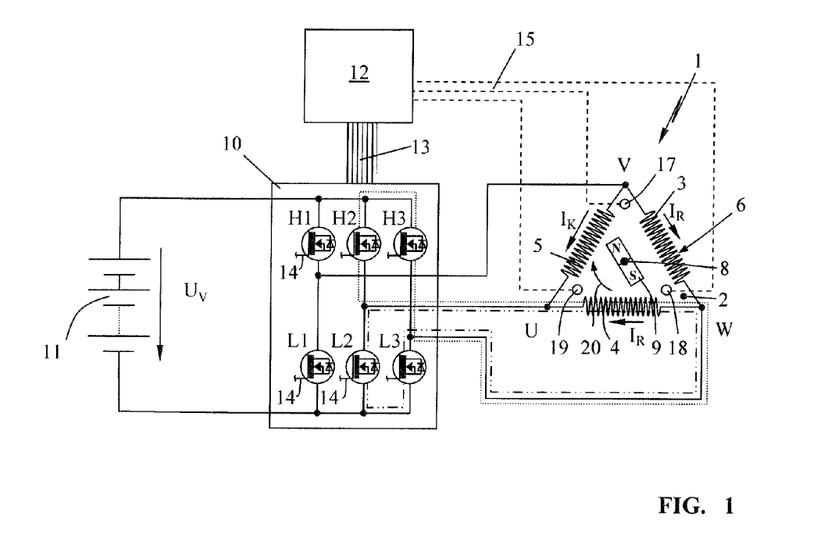
FIG. 1 is a schematic of a brushless DC motor (EC motor) comprising an electronic control unit for commutation.

FIG. 1 shows, schematically, an electronically commutated electric motor 1, which can be in the form of a so-called brushless electronically commutated motor (BEC motor) or electronically commutated motor (EC motor). Such an electronically commutated electric motor 1 comprises a stator 2 comprising field coils (3, 4, 5), which are electrically connected to form a delta circuit 6 in the exemplary embodiment. In this delta circuit 6, the coil ends of adjacent field coils (3, 4, 5) are electrically connected to one another, wherein electrical phase connections U, V and W are formed between in each case two field coils (3, 4, 5) of the coil arrangement. The invention will be explained below with reference to the delta circuit 6; as shown schematically in FIG. 12, the field coils (3, 4, 5) can also be connected to one another in the form of a so-called star circuit 16. In the case of a star circuit, three coil ends are connected to form a common neutral point 7; the remaining coil connections of the field coils (3, 4, 5) form the phase connections (U, V, W) of the star circuit 16.

A rotor 9 which rotates about an axis of rotation 8 is assigned to the stator 2. In the schematically illustrated exemplary embodiment, the rotor 9, in its simplest form, is in the form of a two-pole permanent magnet having a north pole N and a south pole S.

The rotor 9 can be in the form of a rotor rotating in the stator 2 (internal rotor); the rotor 9 can also have a pot-shaped configuration and encompass the arrangement of the field coils (3, 4, 5) wound onto poles (23, 24, 25) (FIG. 2) of the stator 2. An electric motor 1 with such a construction is a so-called external rotor.

The rotor 9 is driven in rotary fashion in a rotating field generated by the field coils (3, 4, 5). For this, it is necessary for the rotating field formed by the arrangement of the field coils (3, 4, 5) to be switched on progressively in the direction of rotation 20 of the rotor 9. This takes place in the brushless DC motor illustrated by electronic commutation, for which purpose a supply voltage $U_V$ is applied to the phase connections U, V and W of the arrangement of the field coils (3, 4, 5) via an actuating unit 10 in a preset sequence. The supply voltage $U_V$ is provided by a voltage source 11 as DC voltage. The voltage source 11 is preferably a rechargeable battery, for example a rechargeable battery based chemically on lithium, which provides the supply voltage $U_V$ for operating the electric motor 1.

The actuating unit 10 has a large number of MOSFETs (H1, H2, H3, L1, L2, L3) as power switches, via which each phase connection (U, V, W) of the arrangement of the field coils (3, 4, 5) can be connected alternately to the positive terminal (high side) of the supply voltage $U_V$ and to the negative terminal (low side) of the supply voltage $U_V$. The MOSFETs (H1, H2, H3, L1, L2, L3) are actuated via a control unit 12, which preferably comprises a microprocessor. For this purpose, the control unit 12 is connected to the respective control connections 14 of the MOSFETs (H1, H2, H3, L1, L2, L3) via control lines 13. In addition, the control unit 12 is supplied the output signals (S1, S2, S3) (FIG. 8) from Hall sensors (17, 18, 19) via sensor lines 15, which Hall sensors are arranged over the circumference of the stator with a spacing with respect to one another and respond to the magnetic field of the rotating rotor 9. Via the output signals (S1, S2, S3) (FIG. 8) of the Hall sensors (17, 18, 19), the control unit 12 can identify the rotary position of the rotor 9 and control the MOSFETs (H1, H2, H3, L1, L2, L3) corresponding to the rotary position of the rotor 9.

In order to apply a torque-generating commutator voltage to the phase connections U and V, for example, the MOSFETS H1 and L2 are turned on, with the result that a torque-forming commutator current $I_K$ can form over the field coil 5. The commutator current $I_K$ over the field coil 5 is indicated by an arrow; a current $I_R$ of half the value flows over the field coils 3 and 4, which are both in parallel with the energized field coil 5.

Continued rotation of the rotor 9 in the direction of rotation 20 is identified via the Hall sensors (17, 18, 19) in order then to switch over, at the correct angle, to the field coil 3 with the phase connections (V, W) corresponding to the angle of rotation of the rotor 9. In this case, a driving rotating field corresponding in each case to the rotary position of the rotor 9 is generated.

If all of the MOSFETs (H1, H2, H3, L1, L2, L3) are in the off state, that is, the power switches are open, no driving voltage is applied to the phase connections (U, V, W) from the outside. If the rotor 9 continues to rotate in the direction of rotation 20, the field coils (3, 4, 5), depending on the rotary position of the rotor 9, have the magnetic field 21 thereof passing through them. The magnetic flux of the rotating permanent magnet which passes through the coils (3, 4, 5) induces an induced voltage $U_I$ in a coil which has a magnitude which is dependent on the change in the flux density per unit time.

Figure 2:
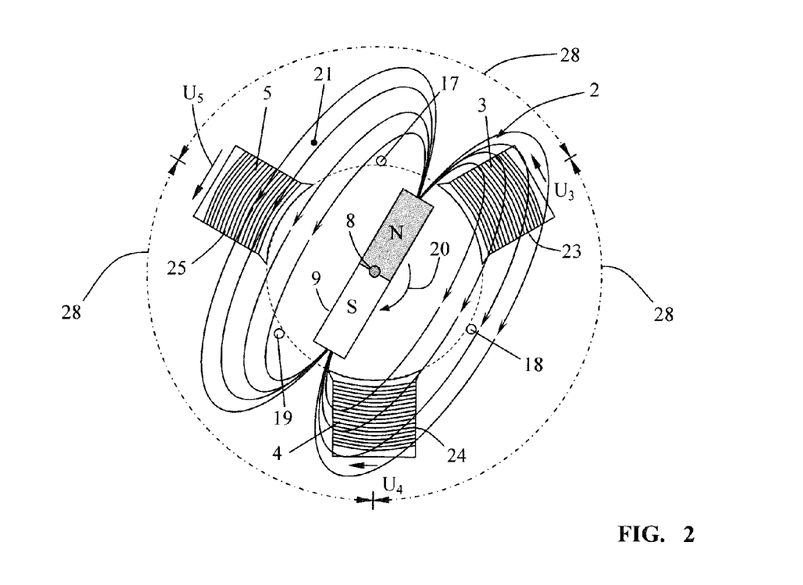
FIG. 2 shows a schematic of a three-phase EC motor in a first rotor position.
Figure 3:
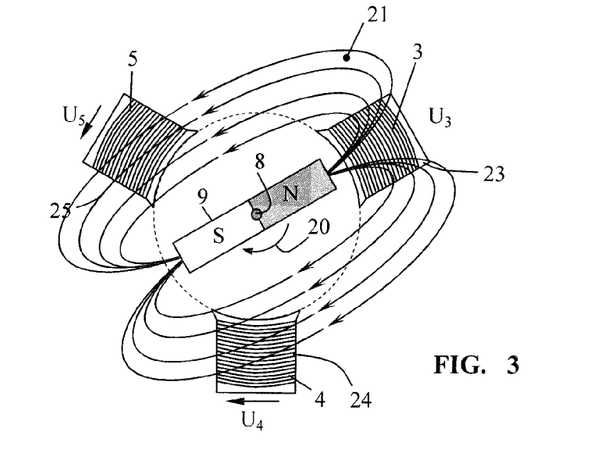
FIG. 3 shows a schematic of a three-phase EC motor as shown in FIG. 2 in a rotor position which is rotated further through 30° in the direction of rotation.
Figure 4:
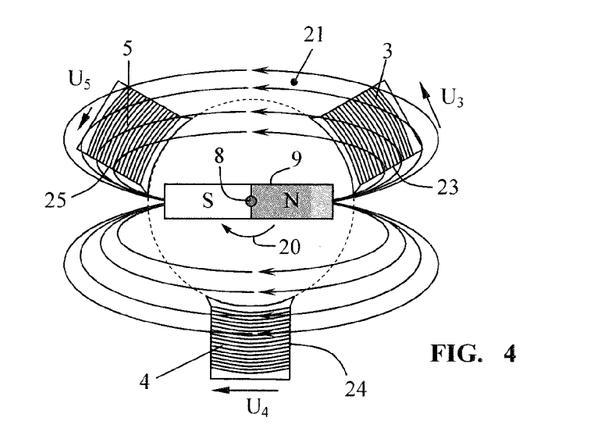
FIG. 4 shows a schematic of a three-phase EC motor as shown in FIG. 3 with a rotor position rotated through a further 30° in the direction of rotation.
Figure 5:
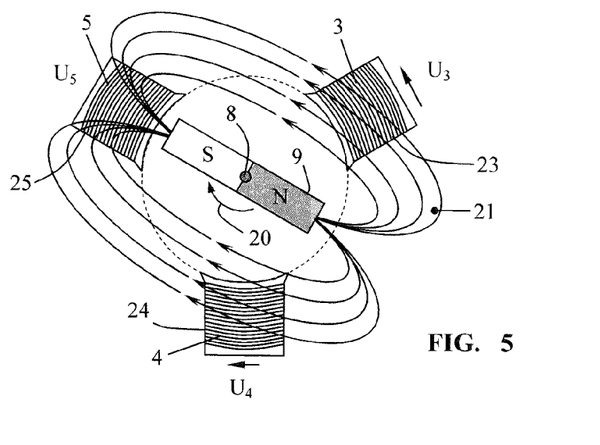
FIG. 5 shows a schematic of a three-phase EC motor as shown in FIG. 4 with a rotor position rotated through a further 30°.
Figure 9:
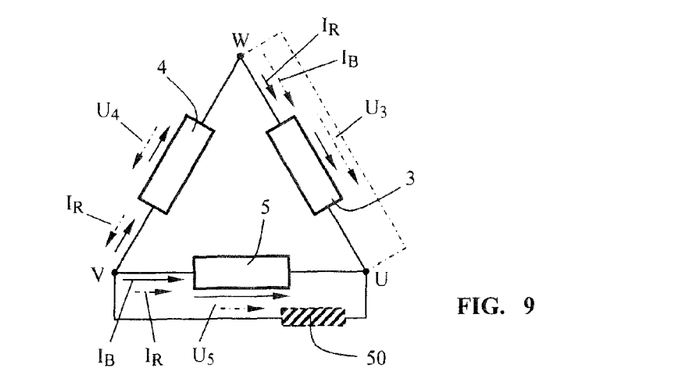
FIG. 9 shows a schematic of the coil currents in the case of a phase short circuit prior to and after commutation from a first field coil to a field coil following in the direction of rotation.

FIGS. 2 to 6 show schematically a stator 2 comprising poles 23, 24 and 25, which are spaced apart from one another over the circumference of the stator 2 with an identical circumferential angle 28. Each pole (23, 24, 25) has a field coil (3, 4, 5), which are electrically connected to one another to form a delta circuit 6 (FIG. 1) in the exemplary embodiment. In the rotor position shown in FIG. 2, the flux density is at its greatest in the field coil 5 and, on further rotation of the rotor 9, will reduce to a minimum value from the position in FIG. 2 into the position in FIG. 5 or have a zero crossing. In FIG. 3, the rotor 9 which is rotated further through 30° has the effect that the voltage $U_3$ induced in the field coil 3 has a zero crossing, while the induced voltage $U_5$ decreases and the voltage $U_4$ increases. On further rotation of the rotor 9 through a further 30° as shown in FIG. 4, there is a maximum induced voltage $U_4$ in the field coil 4, while the induced voltage $U_5$ has decreased further and the induced voltage $U_3$ increases further, that is, becomes greater. In FIG. 5, the voltage $U_5$ induced in the field coil 5 has a zero crossing, while the induced voltage $U_3$ increases further and the induced voltage $U_4$ has decreased further. On further rotation of the rotor 9 in the direction of rotation 20, the induced voltage $U_5$ increases again to a maximum (FIG. 6), but now the polarity of the induced voltage $U_5$ has changed or rotated since, owing to the angle of rotation of 180° which has been effected and the changed position of south pole S and north pole N, the lines of force of the magnetic field 21 pass through the field coil 5, rotated through 180°. In FIG. 9, the lines of force of the magnetic field 21 which pass through the field coil 5 extend in the direction of rotation 20 of the rotor; in FIG. 2, the lines of force of the magnetic field 21 which pass through the field coil 5 extend in the opposite direction to the direction of rotation 20 of the rotor.

Figure 6:
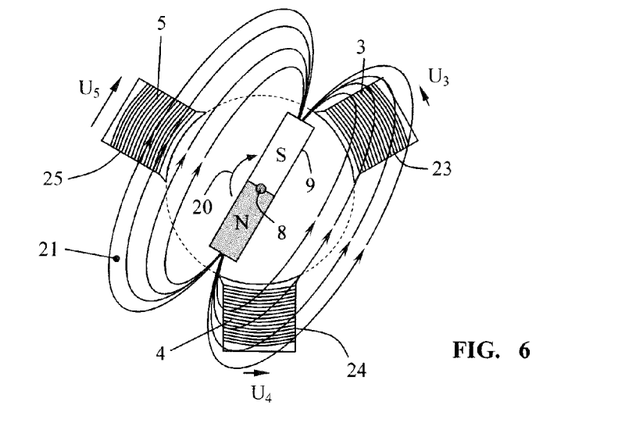
FIG. 6 shows a schematic of a three-phase EC motor as shown in FIG. 5 with a rotor position rotated through a further 90°.

If, in accordance with the method according to the invention for braking the rotor 9, the field coil (3, 4, 5) in which the voltage ($U_3$, $U_4$, $U_5$) induced by the rotating rotor 9 passes through its maximum is always short-circuited, the field coil 5, in FIG. 2, and the field coil 4, in FIG. 4, would be short-circuited. In FIG. 6, then in turn the field coil 5 would be short-circuited.

Figure 7:
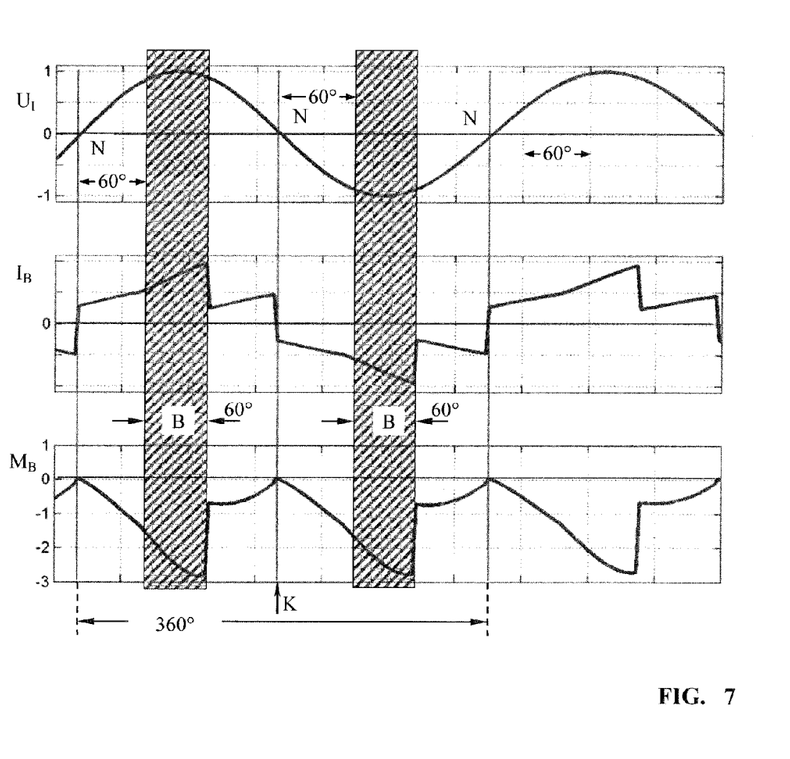
FIG. 7 shows a schematic of the induced voltage occurring in a field coil of a three-phase EC motor over an electrical angle of 360°.

In FIG. 7, the profile of the induced voltage $U_I$ is shown based on the voltage $U_5$ in the field coil 5 as shown in FIGS. 2 to 6, that is over an electrical angle of 360°. If the field coil 5 is short-circuited in the position of the rotor 9 shown in FIG. 2, the induced voltage $U_I$ results in a positive braking current $I_B$, which results in a corresponding braking torque $M_B$.

If the induced voltage $U_I$ changes polarity, this results in a corresponding negative braking current $I_B$, wherein when the induced voltage changes from the positive to the negative range, that is, is commutated at the zero crossing (commutation K), the current through the field coil 5 cannot generate a positive torque, that is, driving torque, during braking.

In accordance with the method according to the invention, which can also be referred to as "controlled short circuit", a rotor position-dependent commutation K therefore takes place in order to compensate for the problem of the phase shift between the braking current $I_B$ in a field coil (3, 4, 5) and the voltage ($U_3$, $U_4$, $U_5$) induced in a field coil (3, 4, 5). By virtue of the commutation K according to the invention, the braking current $I_B$ needs to be brought in phase with the induced electrical voltage ($U_3$, $U_4$, $U_5$). This means that whenever the electrical angle of the induced voltage in a field coil has a zero crossing, the braking current through the field coil also needs to have a zero crossing in the same direction in order that the coil current cannot generate any driving torques during braking of the rotor. This is shown in FIG. 6 by the continuous vertical lines, which each indicate commutation K.

In order to drive the rotor of the electric motor 1, a supply voltage $U_V$ is applied to the respective phase connections (U, V, W) of the field coils (3, 4, 5) via the MOSFETs (H1, H2, H3, L1, L2, L3) of the actuating unit 10, depending on the rotary position of the rotor 9. Since the rotating rotor 9 induces a voltage in the field coils (3, 4, 5), the applied supply voltage $U_V$ needs to be greater than the induced voltage generated by the rotating rotor 9 in the field coils (3, 4, 5). This induced voltage $U_I$, which is in the opposite direction to the supply voltage, is also referred to as BEMF (back-electromotive force) voltage. If the supply voltage $U_V$ is greater than the BEMF voltage, a driving voltage $U_A$ results at the respective field coil. As the rotation speed of the rotor increases, the induced voltage $U_I$ increases; if the induced voltage $U_I$ has gotten close to the applied supply voltage, the maximum rotation speed of the electric motor has been reached. If the induced voltage $U_I$ is intended to be used for braking the rotor 9, the field coil is isolated from the supply voltage $U_V$ and the field coil is short-circuited, with the result that the induced voltage occurring in the field coil is used as braking voltage $U_B$ for braking the rotor.

Since the field coils have natural induction and the current lags the voltage at the field coil, in a case of polarity reversal of the induced voltage and the positive current then still flowing, torques driving the rotor can result which are disadvantageous for braking and extend the braking time. As shown in FIG. 7, therefore, a zero crossing of the braking current is enforced by corresponding commutation K in the case of polarity reversal of the induced voltage $U_I$. In order to brake the rotor 9, in each case two phase connections, for example (U, V), are short-circuited via the switches in the form of MOSFETs in a preset time sequence, and the other phase connection W is held open. The switches or the MOSFETs (H1, H2, H3, L1, L2, L3) of the short-circuited phase connections are selected corresponding to the rotary position of the rotor 9 in such a way that the field coil (3, 4, 5) in which the voltage ($U_3$, $U_4$, $U_5$) induced by the rotating rotor 9 passes through a maximum is always short-circuited.

Figure 8:
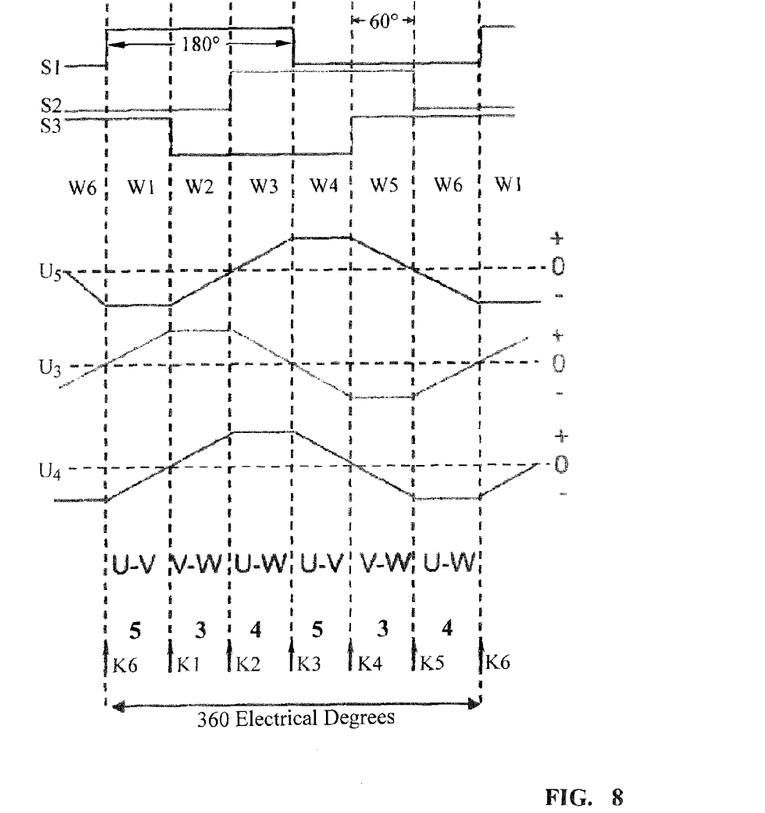
FIG. 8 shows the output signals of Hall sensors occurring during a rotor rotation and the voltages induced in the coils with a logic table for a controlled short circuit.

The consequence of the switched phase short circuits is illustrated schematically in FIG. 8. The signals at the top are the output signals (S1, S2, S3) of the Hall sensors (17, 18, 19). Each Hall sensor (17, 18, 19) is arranged over the circumference of the stator in such a way that it outputs an output signal (S1, S2, S3) over an electrical angle of 120°. Three Hall sensors (17, 18, 19), which are offset with respect to one another in such a way that at no angular segment of 60° are all three Hall sensors (17, 18, 19) outputting an identical output signal ($U_3$, $U_4$, $U_5$), are arranged over the circumference of a stator. This provides the possibility of identifying the angular segment W1 to W6 of 60 angular degrees (based on an electrical angle of 360°) in which the rotor 9 is merely from the state of the output signals (S1, S2, S3) of the three Hall sensors (17, 18, 19).

Beneath the output signals of the Hall sensors, the voltages ($U_3$, $U_4$, $U_5$) induced in the field coils (3, 4, 5) are shown. Each induced voltage ($U_3$, $U_4$, $U_5$) has an approximately sinusoidal profile over an electrical angle of 360°, wherein, in one of the angular segments W1 to W6, each signal ($U_3$, $U_4$, $U_5$) has a positive or negative maximum.

The method according to the invention for a controlled short circuit now provides that whenever a field coil (3, 4, 5) passes through a maximum of its induced voltage ($U_3$, $U_4$, $U_5$) (BEMF voltage), precisely this field coil (3, 4, 5) is short-circuited. If, for example, a maximum, negative voltage $U_5$ is present at the field coil 5 in the angular segment W1, the phase connections U and V are short-circuited, that is, the field coil 5 is short-circuited, in precisely this angular segment W1 with an electrical angle of preferably 60°. Commutation onto the electrically following field coil 3 with a maximum for the induced voltage preferably takes place at the time when the voltage induced in the field coil 3 exceeds a preset threshold value, namely at the time of commutation K1. In this case, the phase connections V-W are short-circuited, with the result that the field coil 3 is short-circuited. If the field coil 4 exceeds a maximum of its induced voltage $U_4$, after a preset electrical angle a subsequent commutation K2 onto the field coil 4 takes place; the phase connections U-W are short-circuited. There now follows, at the time of commutation K3, again a phase short circuit via the field coil 5; the phase connections U-V are short-circuited since, in the following angular segment W4, the maximum of the induced voltage will occur at the field coil 5. For the next commutation K4, short-circuiting of the field coil 3 via the phase connections V-W takes place since, in the angular segment W5, the maximum of an induced voltage U3 is passed through at the field coil 3. At the time of commutation K5, again there is switchover to the field coil 4 since, in the angular segment W6 there is a maximum, negative, induced voltage $U_4$ in the field coil 4. After a further electrical angle of 60°, at the time of commutation K6 there is again switchover to the field coil 5, that is, the phase connections U-V are short-circuited. Therefore, every 60° electrical angle there is switchover to a field coil which is following in the opposite direction to the direction of mechanical rotation over 360 electrical degrees since, owing to the rotating rotor 9, the maximum induced voltage is achieved in the coil following in the direction opposite to the direction of mechanical rotation. Each field coil (3, 4, 5) is short-circuited twice over an electrical revolution of the rotor 9.

The current flowing in the short-circuited field coil and the parallel field coils, in the case of a delta circuit 6, forms a braking current which generates a braking torque $M_B$ which exclusively decelerates the rotor. The commutation K1 to K6 results in the induced voltage $U_I$ in a field coil always being in phase with the braking current in the respective field coil, with the result that exclusively a decelerating braking torque $M_B$ is produced. The phase shift between the voltage and the current which occurs owing to the inductance of the coil can be influenced by the commutation in such a way that a drive torque which is otherwise possible during braking and which accelerates the rotor is minimized or largely avoided. By means of corresponding control, it is also possible to achieve a situation whereby a drive torque accelerating the rotor during braking is suppressed.

FIG. 9 illustrates schematically the commutation from the field coil 5 to the field coil 3. In a first state, the field coil 5, that is, the phase connections U and V, is short-circuited. The voltage $U_5$ induced in the field coil 5 has a maximum; a correspondingly large braking current $I_B$ flows via the field coil 5.

Figure 10:
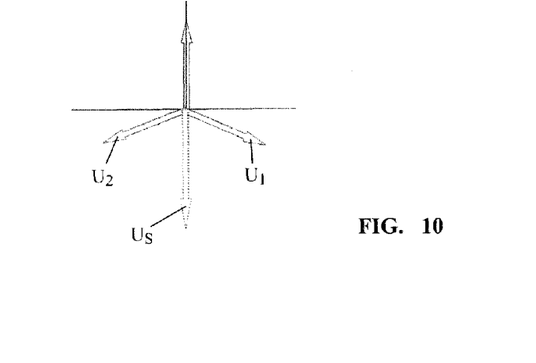
FIG. 10 shows a schematic of the electrical voltage induced in the field coils.

The state of the phase short circuit via the phase connections U-V is illustrated by continuous lines. Corresponding to the phase short circuit via U-V, the field coils 3 and 4, as a series circuit, are connected in parallel with the short-circuited field coil 5. The voltages $U_3$ and $U_4$ induced in the field coils 3 and 4 add up to a summation voltage $U_S$ corresponding to the illustration in FIG. 10 corresponding to the physical arrangement of the field coils 3 and 4, which summation voltage necessitates a current $I_R$ through the series circuit.

Before the generated braking torque can tip over into accelerating torque owing to the phase shift between the voltage and the current, there is commutation from the field coil 5 onto the field coil 3, that is, the phase short circuit via the phase connections U-V is switched onto the phase connections U-W, with the result that, after the commutation, the field coil 3 is short-circuited. This state is illustrated by dash-dotted lines in FIG. 9.

The braking current $I_B$ through the field coil 3 flows in the same direction as the current $I_R$ flowing, with the present commutation, through the series circuit. As a result of the commutation, however, the current direction through the field coil 4 changes. The induced voltage $U_4$ reverses polarity; correspondingly, the direction of the current flow of the current $I_R$ through the series circuit comprising the field coils 4 and 5 changes. As a result, tipping of the braking torque into a temporarily accelerating torque can be avoided.

Figure 11:
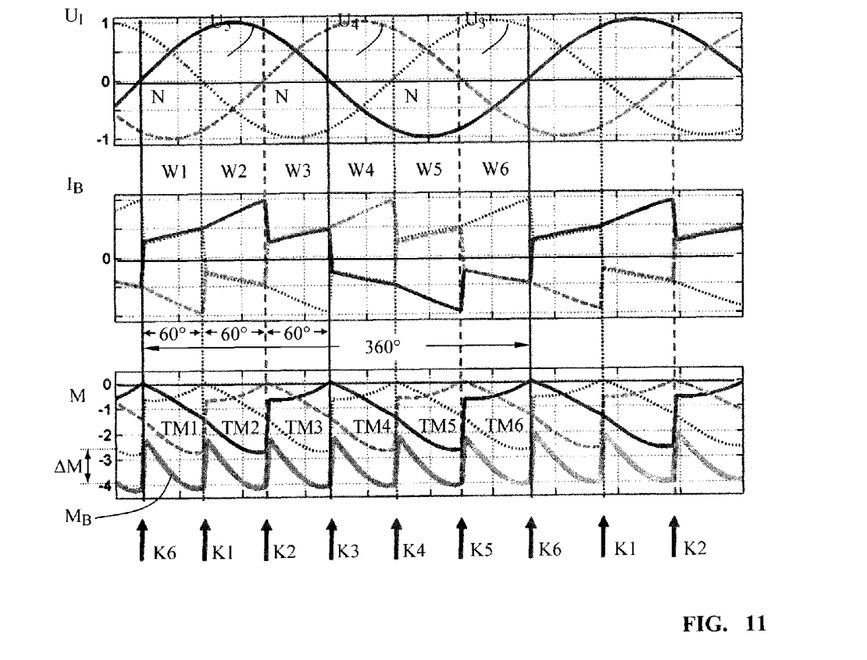
FIG. 11 shows a schematic of the electrical rotor angle, of the coil currents occurring and of the resultant total torque in the case of a controlled short circuit with commutation according to the invention.

FIG. 11 illustrates, in the uppermost figure, generally the phase angle of the induced voltage $U_I$ as voltages ($U_3$, $U_4$, $U_5$) of all three field coils (3, 4, 5); in the diagram beneath this, the braking current $I_B$ flowing in the respective coils is illustrated. Beneath this, the profile of the braking torque $M_B$ resulting from the braking current $I_S$ is illustrated for each coil. The induced voltage $U_I$, the braking current $I_B$ and the resultant torque M of a field coil 5 are illustrated with a continuous line in all three illustrations; the magnitudes of the second field coil 4 are illustrated by dashed lines, and the magnitudes of the third field coil 3 are illustrated by dotted lines.

A commutation K1 to K6 from one field coil to the next field coil takes place every 60° over an electrical angle of 360°.

First, in a first angular segment W1 of 60°, the field coil 4 is short-circuited (dashed characteristic), as a result of which, owing to the braking current in the field coil 4, a braking torque element TM1 results, which is illustrated in the diagram at the bottom. The first angular segment is selected such that the field coil 4 is short-circuited approximately 30° prior to up to 30° following the maximum of the induced voltage $U_4$. After an electrical angle of 60°, the phase short circuit is switched over with the commutation K1 to the field coil 5, as a result of which a braking torque element TM2 results, as is specified in the illustration below. After a further electrical angle of 60°, there is switchover to the field coil 3 with the commutation K2, as a result of which a braking torque element TM3 results. The coils 4, 5 and 3 are again short-circuited after in each case an electrical angle of 60° by virtue of the further commutations K3, K4, K5 and K6. This results in, as braking torque, the braking torque elements TM1 to TM6 being arranged sequentially over an electrical angle of 360°. It becomes apparent that the commutation K is selected such that there is commutation onto a subsequent field coil whenever the induced voltage thereof passes through its maximum. This range B is highlighted with hatching in the illustration in FIG. 7. FIG. 7 also shows that a field coil is short-circuited whenever the induced voltage thereof passes through a zero crossing, to be precise approximately at an electrical angle of 60° after a zero crossing N.

Owing to the delta circuit, an induced voltage and a resultant braking current, which is added to the braking torque elements, results in the series circuit comprising the remaining field coil, which series circuit is in each case in parallel with the short-circuited field coil, which results in an increase in the braking torque $M_B$ by $\Delta M$. The torque profile of the braking torque $M_B$ is shown in the continuous line at the bottom in FIG. 11.

Figure 12:
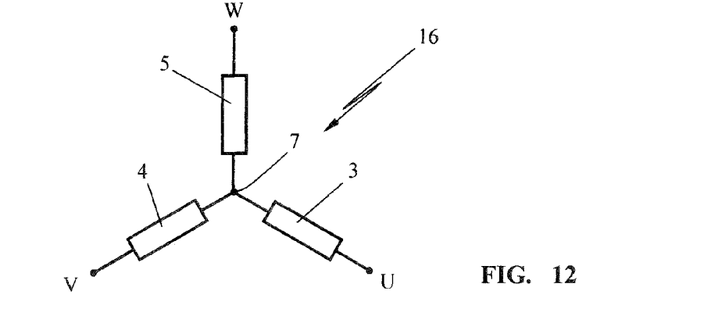
FIG. 12 is a schematic showing the field coils of the stator of an EC motor in a star circuit.

The method according to the invention can advantageously be used not only in the case of field coils with a delta circuit, but also in the case of field coils with a star circuit, as is illustrated schematically in FIG. 12. For a star circuit, quantitatively different profiles for the braking torque result; for this reason, the method according to the invention is also possible in the case of an EC motor with star-connected field coils with the same advantages.

Figure 13:
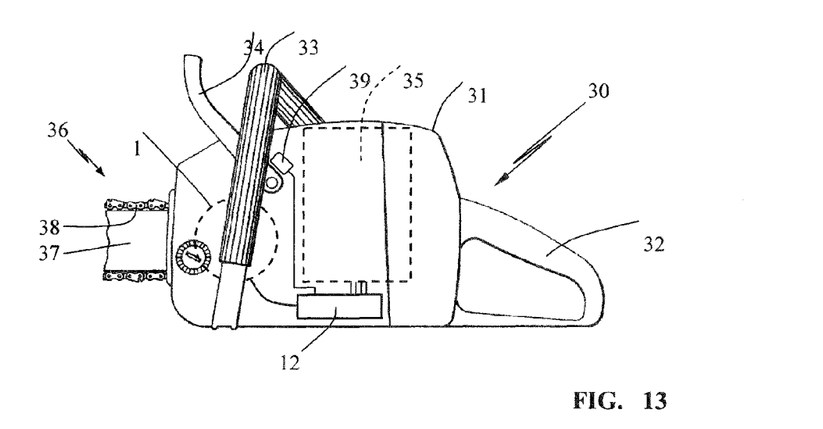
FIG. 13 shows a schematic of a motor-operated chainsaw with a braking circuit according to the invention for braking the tool.

FIG. 13 shows a schematic illustration of a motor-operated chainsaw 30 as an example of a portable, handheld work apparatus. The motor-operated chainsaw 30 comprises a housing 31, which has a rear handle 32 and a front bow-shaped handle 33 spanning the housing 31. In front of the bow-shaped handle 33 arranged transversely to the longitudinal axis of the motor-operated chainsaw 30 there is a handguard 34 as trigger for a safety brake device.

An electric drive motor, in particular an EC motor 1, which is controlled via a control unit 12 (see FIG. 1), is provided in the housing 31 of the motor-operated chainsaw 30. In addition, a rechargeable battery pack 35 is provided in the housing 31, the rechargeable battery pack providing the supply voltage $U_V$ to the electric motor 1 and the control unit 12. The electric motor 1, as electric drive motor, drives a tool 36 via a pinion (not illustrated in any more detail), which tool is a saw chain 38 revolving on a guide rail 37 in the exemplary embodiment illustrated. The handguard 34 can have a sensor 39, which detects triggering of the handguard 34 and outputs an output signal to the control unit 12.

With the method according to the invention, the tool 36 can be brought to a standstill in fractions of a second.

If the handguard 34 is triggered, this is communicated to the control unit 12 via the sensor 39. The control unit switches off the drive in fractions of a second and initiates electrical braking of the drive motor, in which, in a first step, the phase connections of a first field coil are short-circuited via associated switches (FIG. 1), with the result that a braking current flows via the first field coil and the second and third field coils, as a series circuit, are in parallel with the first field coil. In a second step, the phase connections of a second field coil which follows in the direction of rotation of the rotor are short-circuited via associated switches, with the result that a braking current now flows via the second field coil and the third and first field coils, as a series circuit, are in parallel with the second field coil. In a third step, the phase connections of the third field coil are short-circuited via associated switches, with the result that a braking current flows via the third field coil and the first and second field coils, as a series circuit, are in parallel with the third field coil. These steps, that is, the repeated switching of phase short circuits via the phase connections U, V and W in a temporal sequence depending on the rotary position of the rotor, are continued until a preset lower limit rotation speed of the rotor has been reached or else until the rotor has been braked to a standstill.

Figure 14:
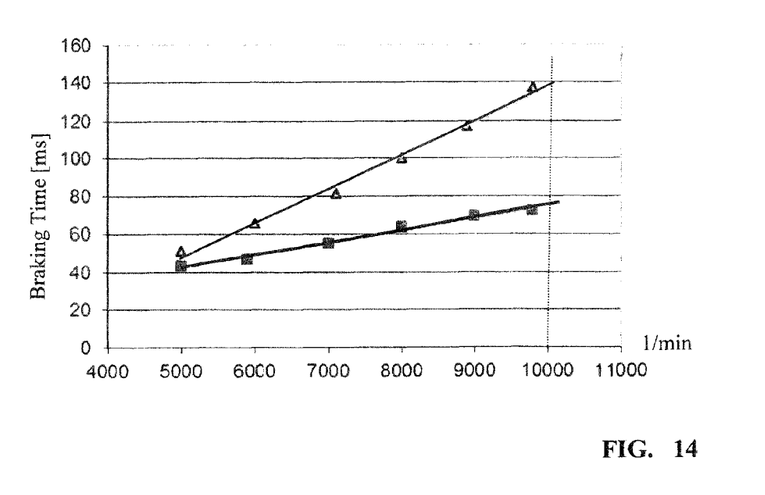
FIG. 14 shows a graph illustrating the braking times over the rotation speed for comparison of a hard short circuit and a controlled short circuit; and, FIG. 15 shows a schematic of a hedge trimmer comprising a braking circuit according to the invention for braking the drive motor and the tool.

FIG. 14 illustrates the braking time over the rotation speed. The line at the top shows the braking time over the rotation speed in the case of a "hard short circuit", that is, the phase connections U, V and W are permanently short-circuited at the same time as one another. The line at the bottom shows the "controlled short circuit" according to the invention, that is, the field coils in which a maximum of the induced voltage is present at that time are short-circuited during braking. This results in a marked reduction in the braking time, which in particular results in a reduction in the braking time of almost 50% from relatively high rotation speeds of, for example, 10 000 rpm.

Figure 15:
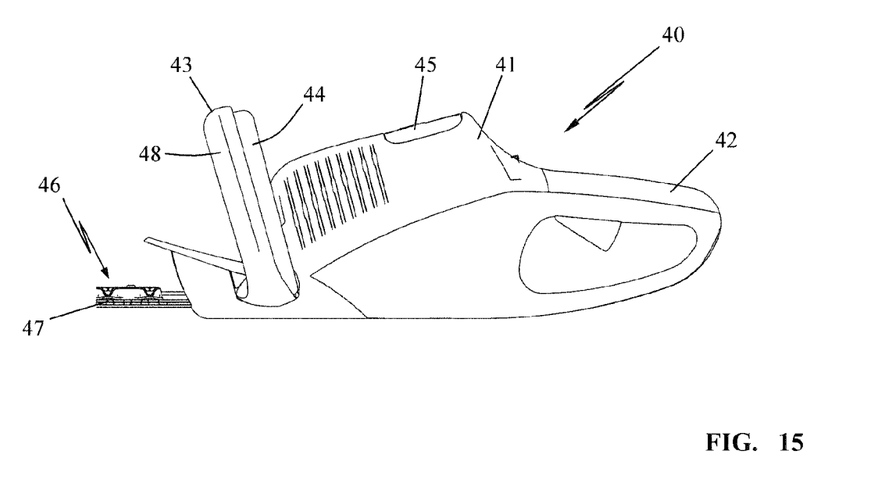

A further exemplary embodiment of a portable, handheld work apparatus is shown in FIG. 15. The work apparatus shown in the figure is a hedge trimmer 40 with a rear handle 42 and a front bow-shaped handle 43, which is positioned transversely with respect to the longitudinal direction of the work apparatus. A rechargeable battery pack 45 has been inserted into the housing 41 of the hedge trimmer 40 and, in a corresponding manner to that described with respect to the motor-operated chainsaw 30 in FIG. 13, drives a drive motor which drives the tool 46 via a gear mechanism. The tool 46 in this exemplary embodiment is a blade bar 47. The bow-shaped handle 43 comprises two shell elements 44 and 48, which are movable relative to one another. When the bow-shaped handle 43 is gripped by the hand of the user, the shell elements 44 and 48 are moved towards one another and switch a contact, which indicates that the bow-shaped handle 43 has been gripped by the user. This so-called two-handed safety mechanism ensures that the user can only bring the hedge trimmer 40 into operation when the handle is held properly. If one hand is removed from the rear handle or from the front bow-shaped handle, a corresponding contact switches and the control unit brings the motor to a standstill, wherein, in turn, the method according to the invention for the controlled short circuit is used. Within very short braking times, the tool 46 comes to a standstill.

The field coils (3, 4, 5) can be short-circuited directly in order to achieve a maximum braking current. It may be expedient to short-circuit a field coil via a braking resistor 50, as is shown in FIG. 9. By virtue of such a braking resistor, damping or limitation of the short-circuit currents occurring results, which can be expedient for protecting the components electrically.

It is understood that the foregoing description is that of the preferred embodiments of the invention and that various changes and modifications may be made thereto without departing from the spirit and scope of the invention as defined in the appended claims.

What is claimed is:

1. A method for braking an electric drive motor having:
  a rotor;
  a stator defining a periphery;
  a plurality of field coils;
  said stator being configured to carry said field coils over said periphery such that said field coils are in spaced relationship to each other;
  said field coils having electrical phase connections (U, V, W) for at least three motor phases;
  a voltage supply ($U_V$);
  a plurality of electronic switches (H1, H2, H3, L1, L2, L3);
  said electrical phase connections being connected to said voltage supply via corresponding ones of said electronic switches (H1, H2, H3, L1, L2, L3) to generate an electromagnetic field to drive said rotor;
  a control unit configured to actuate said electronic switches (H1, H2, H3, L1, L2, L3) and to close said switches in dependence on the rotational position of said rotor;
  said control unit being further configured to generate a braking current ($I_B$) to brake said rotor by short-circuiting said electrical phase connections (U, V, W);
  the method comprising the steps of:
  switching a phase short circuit between each two of said phase connections (U-V, V-W, W-U) of said field coils via said electronic switches (H1, H2, H3, L1, L2, L3) in a predetermined temporal sequence while a further one of said phase connections (W, U, V) remains open; and,
  selecting phase connections (U-V, V-W, W-U) short circuited by said electronic switches (H1, H2, H3, L1, L2, L3) each in correspondence to the rotational position of the rotor such that the field coil is short circuited in which the induction voltage ($U_I$) generated by the magnetic field of the rotating rotor passes through its maximum.

2. The method of claim 1, wherein each one of said field coils is short circuited when the induction voltage ($U_I$) passes through a zero crossover (N) after a 40° to 70° electric angle.

3. The method of claim 2, wherein said electric angle is 60°.

4. The method of claim 1, wherein a switchover from a first phase short circuit to a next phase short circuit occurs after 60° of the electric angle for each switchover.

5. The method of claim 1, wherein said field coils are connected to each other in a three-phrase motor to generate a rotating field.

6. The method of claim 5, further comprising the method steps of:
  in a first step, short circuiting the phase connections (U, V) of a first one of said field coils via those ones of said electronic switches (H1, H2; L1, L2) corresponding to said phase connections (U, V) so as to cause a braking current ($I_B$) to flow through said first coil and to cause a second and a third one of said field coils to be connected in a series circuit in parallel with said first coil;
  in a second step, short circuiting the phase connections (V, W) of said second coil which follows opposite to the mechanical rotational direction of said rotor, via those ones of said electronic switches (H1, H3, L1, L3), which correspond to said phase connections (V, W) so as to cause a braking current ($I_B$) to flow through said second coil and to cause said first coil and said third coil to be connected in a series circuit in parallel with said second coil;
  in a third step, short circuiting the phase connections (W, U) of said third coil, which follows opposite to the mechanical rotation of said rotor, via those ones of said electronic switches (H2, H3, L2, L3), which correspond to said phase connections (W, U), so as to cause a braking current ($I_B$) to flow through said third coil and to cause said first coil and said second coil to be connected in a series circuit in parallel with said third coil; and,
  repeating the switching of the phase short circuiting in a time sequence in dependence upon the rotational position of said rotor until a pregiven lower limit rpm of said rotor is reached.

7. The method of claim 1, wherein each one of said field coils is short circuited twice over one electrical rotation of said rotor.

8. The method of claim 7, wherein said supply voltage ($U_V$) has a high side and a low side; and, said method further comprises the method steps of:
  connecting the phase connections (U, V, W) of respective ones of said field coils to said high side of said supply voltage ($U_V$) via corresponding ones of said electronic switches (H1, H2, H3) and to said low side of said supply voltage ($U_V$) via corresponding ones of said electronic switches (L1, L2, L3); and,
  over an electric rotation of said rotor, short circuiting said phase connections (U, V, W) of corresponding ones of said field coils once via the electronic switches (L1, L2, L3) to said low side and once via the electronic switches (H1, H2, H3) to said high side.

9. The method of claim 8, further comprising the method step of: for braking said rotor, short circuiting respective ones of said field coils via a first short circuiting via corresponding ones of said electronic switches (H1, H2, H3) to said high side and via a subsequent short circuiting via corresponding ones of said electronic switches (L1, L2, L3) to said low side.

10. The method of claim 1, wherein said field coils are electrically interconnected in a delta circuit and a corresponding one of said phase connections (U, V, W) is disposed between corresponding ones of each two of said field coils so as to cause a first one of said field coils to connect in parallel with a series connection a second and third one of said field coils when there is a phase short circuit.

11. The method of claim 1, wherein said rotor is braked up to standstill.

12. The method of claim 1, wherein said electric drive motor further has sensors for determining the rotational position of said rotor.

13. The method of claim 12, wherein said sensors are Hall sensors.

14. The method of claim 1, wherein the rotational position of said rotor is determined without sensors.

15. The method of claim 14, further comprising the method step of determining the rotational position of said rotor from the magnitude and/or course of the electric voltage ($U_3$, $U_4$, $U_5$) induced in corresponding ones of said field coils or the induced electric current.

16. A work apparatus comprising:
a work tool;
an electric motor for driving said work tool; and,
said electric drive motor including:
a rotor;
a stator defining a periphery;
a plurality of field coils;
said stator being configured to carry said field coils over said periphery such that said field coils are in spaced relationship to each other;
said field coils having electrical phase connections (U, V, W) for at least three motor phases;
a voltage supply ($U_V$);
a plurality of electronic switches (H1, H2, H3, L1, L2, L3);
said electrical phase connections being connected to said voltage supply via corresponding ones of said electronic switches (H1, H2, H3, L1, L2, L3) to generate an electromagnetic field to drive said rotor;
a control unit configured to actuate said electronic switches (H1, H2, H3, L1, L2, L3) and to close said switches in dependence on the rotational position of said rotor;
said control unit being further configured to generate a braking current ($I_B$) to brake said rotor by short-circuiting said electrical phase connections (U, V, W);
said control unit being configured to function as a safety braking device by carrying out the following method steps to bring said work tool to standstill:
switching a phase short circuit between each two of said phase connections (U-V, V-W, W-U) of said field coils via said electronic switches (H1, H2, H3, L1, L2, L3) in a predetermined temporal sequence while a further one of said phase connections (W, U, V) remains open; and,
selecting phase connections (U-V, V-W, W-U) short circuited by said electronic switches (H1, H2, H3, L1, L2, L3) each in correspondence to the rotational position of the rotor such that the field coil is short circuited in which the induction voltage ($U_I$) generated by the magnetic field of the rotating rotor passes through its maximum.

17. The work apparatus of claim 16, wherein said work apparatus is a portable handheld work apparatus.

18. The work apparatus of claim 16, wherein said work apparatus is a portable handheld motor-driven chainsaw and said work tool is a saw chain of said motor-driven chainsaw.

* * * * *